United States Patent
Wong et al.

(10) Patent No.: US 7,312,430 B2
(45) Date of Patent: Dec. 25, 2007

(54) SYSTEM, DISPLAY APPARATUS AND METHOD FOR PROVIDING CONTROLLED ILLUMINATION USING INTERNAL REFLECTION

(75) Inventors: Lye Yee Wong, Penang (MY); Kok Peng Lim, Penang (MY); Kar Phooi Foong, Penang (MY)

(73) Assignee: Avago Technologies ECBUIP Pte Ltd, Singapore (SG)

( * ) Notice: Subject to any disclaimer, the term of this patent is extended or adjusted under 35 U.S.C. 154(b) by 77 days.

(21) Appl. No.: 11/173,208

(22) Filed: Jul. 1, 2005

(65) Prior Publication Data

US 2007/0007431 A1    Jan. 11, 2007

(51) Int. Cl.
*G01J 1/32*    (2006.01)
(52) U.S. Cl. ...................... 250/205; 250/239
(58) Field of Classification Search ............... 250/205, 250/226, 578.1, 221; 315/158, 307, 154; 372/29.011, 29.014
See application file for complete search history.

(56) References Cited

U.S. PATENT DOCUMENTS

| | | | |
|---|---|---|---|
| 5,301,090 A * | 4/1994 | Hed | 362/558 |
| 5,453,855 A * | 9/1995 | Nakamura et al. | 349/58 |
| 5,932,327 A * | 8/1999 | Inoguchi et al. | 428/212 |
| 6,255,784 B1 * | 7/2001 | Weindorf | 315/291 |
| 6,268,432 B1 * | 7/2001 | Nakata et al. | 524/588 |
| 6,441,558 B1 | 8/2002 | Muthu et al. | |
| 6,495,964 B1 * | 12/2002 | Muthu et al. | 315/149 |
| 6,504,143 B2 * | 1/2003 | Koops et al. | 250/221 |
| 6,707,435 B1 * | 3/2004 | Merlato et al. | 345/39 |
| 6,741,351 B2 * | 5/2004 | Marshall et al. | 356/406 |
| 2004/0051931 A1 * | 3/2004 | Minami et al. | 359/265 |
| 2005/0135441 A1 * | 6/2005 | Ng et al. | 372/29.014 |
| 2005/0200293 A1 * | 9/2005 | Naugler et al. | 315/149 |
| 2006/0227085 A1 * | 10/2006 | Boldt et al. | 345/83 |

\* cited by examiner

*Primary Examiner*—Que T Le

(57) ABSTRACT

A system, display apparatus and method for providing illumination uses internal reflection to monitor and control the illumination, which is produced by light from a number of light source devices, such as light emitting diodes. Some of the light generated by the light source devices is transmitted into an optically transparent region between the light source devices and a substrate, where the light is internally reflected within the optically transparent region. The optical properties of the light within the optically transparent region are measured using an optical sensor positioned within the optically transparent region so that the light generated by the light source devices can be selectively adjusted to control the illumination.

20 Claims, 3 Drawing Sheets

SYSTEM, DISPLAY APPARATUS AND METHOD FOR PROVIDING CONTROLLED ILLUMINATION USING INTERNAL REFLECTION

BACKGROUND OF THE INVENTION

For more than eighty years, traffic light signals and pedestrian signals have guided motorists and pedestrians at potentially dangerous roadway intersections to prevent vehicular accidents. The design and construction of these illuminated traffic signs have remained relatively unchanged until recent development of light emitting diode (LED) technologies.

With the development of brighter LEDs, these semiconductor devices are now being used as light sources in many lighting applications, including illuminated traffic signs, which have traditionally used conventional light sources, such as incandescent, halogen and fluorescent lamps. This is due in part to the fact that LEDs have many advantages over conventional light sources. These advantages include longer operating life, lower power consumption and smaller size.

However, since illuminated traffic signs must comply with a specified standard, e.g., National Transportation for ITS Protocol (NTCIP), current methods for building illuminated traffic signs with LEDs are complicated and require expertise in many areas, including video camera systems, video system viewing angle, and viewing distance analysis, as well as equipment setup and calibration. These conventional methods typically involve calibrating the illuminated traffic signs by generating a white base signal before setup in the field as a reference to ensure that the illuminated traffic signs are manufactured, installed and operational as specified in the required standard. This reference point will then be used in the field as a calibration point to produce white balanced signs with proper ratio of red, green and blue. In order to produce these white balanced signs, the right ratio of color binning is required, which involves a series of mix and match evaluations to generate a white base point. This process involves thousands of color mixing matrixes by varying the luminous intensity, dominant wavelength and the forward voltage.

A concern with these conventional illuminated traffic signs is that the light output of the LEDs degrades over time due to current stress, which causes the calibrated colors and brightness of the signs to deviate from their initial settings. These traffic signs may be recalibrated to compensate for LED light output degradation. However, recalibration requires a complete measurement tool setup and is very time consuming.

In view of this concern, there is a need for an illuminated traffic sign and method for providing illumination that can compensate for LED light output degradation over time.

SUMMARY OF THE INVENTION

A system, display apparatus and method for providing illumination uses internal reflection to monitor and control the illumination, which is produced by light from a number of light source devices, such as light emitting diodes. Some of the light generated by the light source devices is transmitted into an optically transparent region between the light source devices and a substrate, where the light is internally reflected within the optically transparent region. The optical properties of the light within the optically transparent region are measured using an optical sensor positioned within the optically transparent region so that the light generated by the light source devices can be selectively adjusted to control the illumination.

An illumination system in accordance with an embodiment of the invention comprises a substrate, a plurality of light source devices positioned over the substrate, the light source devices being configured to emit light, an optically transparent region between the light source devices and the substrate, a reflective layer over the optically transparent region to internally reflect some of the light emitted from the light source devices within the optically transparent region, and an optical sensor positioned within the optically transparent region to receive some of the light within the optically transparent region to measure optical properties of the light from the light source devices.

An illuminated display apparatus in accordance with an embodiment of the invention comprises at least one system for providing an illumination. The system comprises a substrate, a plurality of light source devices positioned over the substrate, the light source devices being configured to emit light, an optically transparent region between the light source devices and the substrate, a reflective layer over the optically transparent region to internally reflect some of the light emitted from the light source devices within the optically transparent region, an optical sensor positioned within the optically transparent region to receive some of the light within the optically transparent region to measure optical properties of the light from the light source devices, and a controller operatively connected to the optical sensor and the light source devices. The controller is configured to generate driving signals in response to the optical properties measured by the optical sensor. The driving signals are selectively applied to the light source devices to adjust the optical properties of the light from the light source devices.

A method for providing illumination in accordance with an embodiment of the invention comprises generating light at light source devices positioned over a substrate in response to driving signals applied to the light source devices, including transmitting some of the light into an optically transparent region between the light source devices and the substrate, internally reflecting some of the light within the optically transparent region, measuring optical properties of the light within the optically transparent region, and modifying the driving signals to adjust the optical properties of the light generated by the light source devices.

Other aspects and advantages of the present invention will become apparent from the following detailed description, taken in conjunction with the accompanying drawings, illustrated by way of example of the principles of the invention.

DETAILED DESCRIPTION

Figure 1:
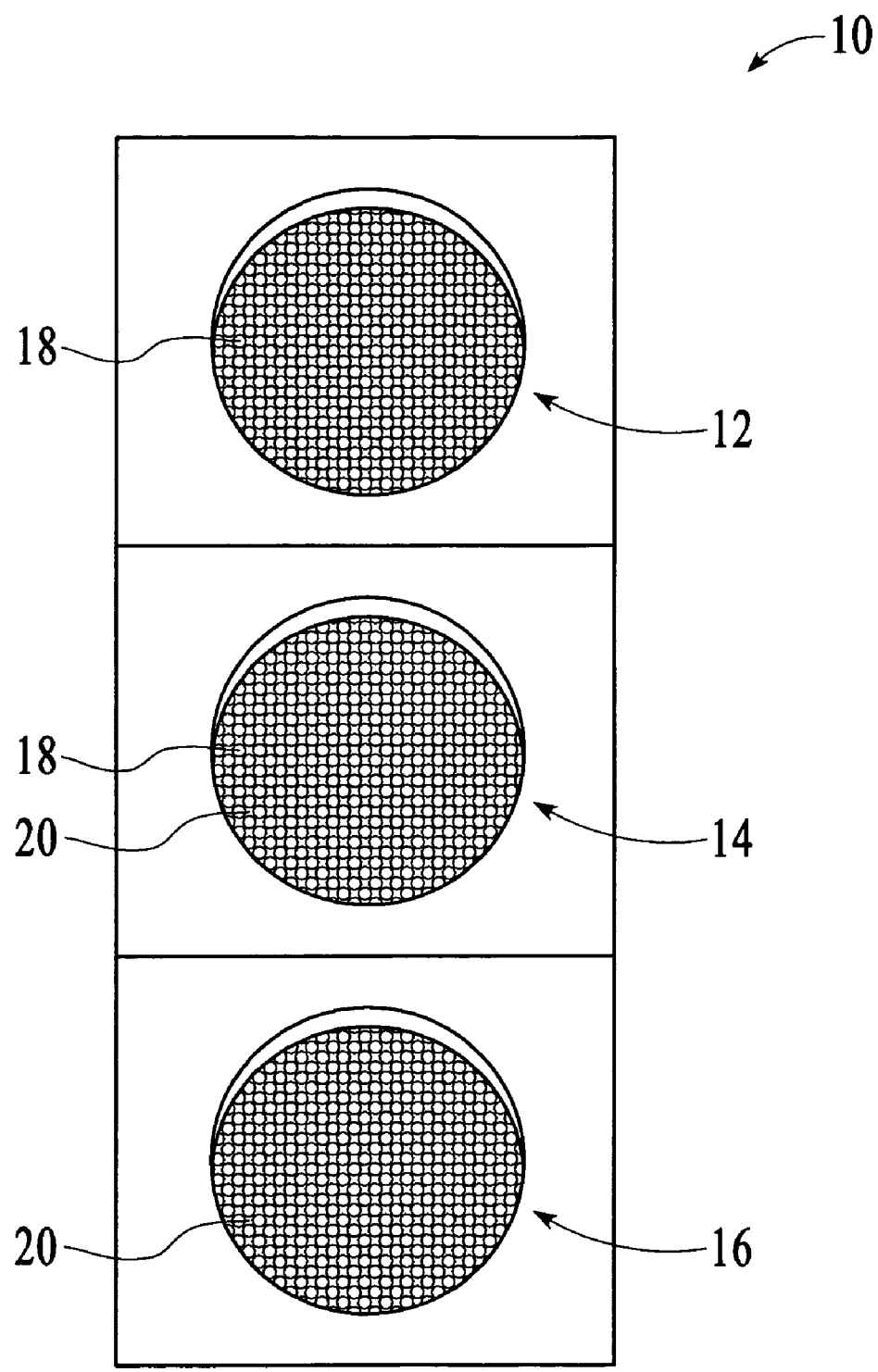
FIG. 1 shows an illuminated display apparatus in the form of a traffic light signal in accordance with an embodiment of the invention.

With reference to FIG. 1, an illuminated display apparatus 10 in accordance with an embodiment of the invention is described. The illuminated display apparatus 10 uses semiconductor light source devices, such as light emitting diodes (LEDs), to provide illumination in one or more colors. The illuminated display apparatus 10 shown in FIG. 1 is a traffic light signal. However, the illuminated display apparatus 10 may be any type of an illuminated traffic sign, such as a pedestrian signal, or any type of a display device, which is illuminated in one or more colors. As described in more detail below, the illuminated display apparatus 10 is designed to monitor and adjust, if necessary, the optical properties of the illumination so that the optical properties of the illumination are maintained at desired settings throughout the operating life of the apparatus. Thus, any degradation in the illumination due to decrease in light output of one or more semiconductor light sources devices in the illuminated display apparatus 10 can be corrected by selectively adjusting the semiconductor light source devices. Furthermore, the illuminated display apparatus 10 does not have to be calibrated with respect to color or brightness since the apparatus can self-adjust the color and brightness of the illumination to comply with a particular standard, e.g., National Transportation for ITS Protocol (NTCIP).

In the illustrated embodiment, the illuminated display apparatus 10 includes color illumination systems 12, 14 and 16. The color illumination system 12 provides red illumination when activated. Similarly, the color illumination system 14 provides yellow illumination when activated, and the color illumination system 16 provides green illumination when activated. Each of the color illumination systems 12, 14 and 16 includes a number of LEDs to produce the particular illumination. Thus, depending on the color of the illumination, each color illumination system includes one or more different color LEDs. As an example, the color illumination system 14 may include only red LEDs 18, i.e., LEDs that generate red light, to produce red illumination. Similarly, as an example, the color illumination system 16 may include only green LEDs 20, i.e., LEDs that generate green light, to produce green illumination. However, as an example, the color illumination system 14 may include red and green LEDs 18 and 20, to produce yellow illumination. As described in detail below, each color illumination system is configured to monitor the illumination provided by the LEDs of that system to ensure that the proper light output and/or color of the illumination are maintained throughout the operation of the illuminated display apparatus 10. Although the illuminated display apparatus 10 in the illustrated embodiment is shown to include three color illumination systems, the illuminated display apparatus in other embodiments may include fewer or more color illumination systems.

Figure 2:
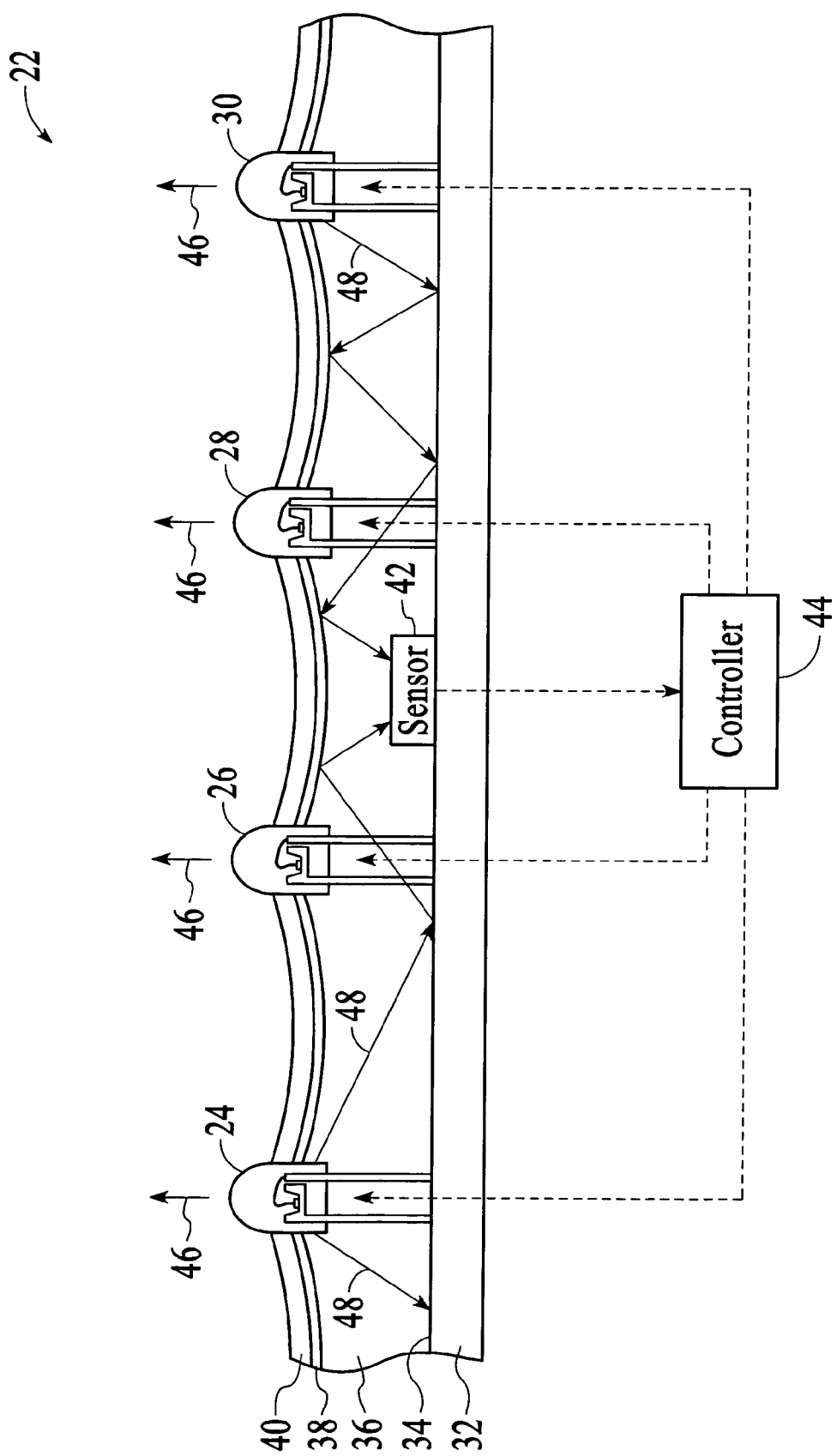
FIG. 2 is a diagram of a color illumination system in accordance with an embodiment of the invention, which may be used in the illuminated display apparatus of FIG. 1.

Turning now to FIG. 2, a color illumination system 22 in accordance with an embodiment of the invention is shown. The color illumination system 22 is an example of the color illumination systems 12, 14 and 16 included in the illuminated display apparatus 10 of FIG. 1. As shown in FIG. 2, the color illumination system 22 includes a number of LEDs 24, 26, 28 and 30 connected to a substrate 32. Although only four LEDs 24, 26, 28 and 30 are shown in FIG. 2, the color illumination system 22 may include many more LEDs. In other embodiments, the color illumination system 22 may include other types of light source devices. Each of the LEDs 24, 26, 28 and 30 emits light, which is combined with the emitted light of the other LEDs to produce a color illumination. The color types of the LEDs 24, 26, 28 and 30 included in the color illumination system 22 depends on the desired color of the illumination provided by the color illumination system 22. Thus, in some implementations, the color illumination system 22 may include only one color LEDs, e.g., red or green LEDs. In other implementations, the color illumination system 22 may include two or more different color LEDs, e.g., red and green LEDs. The LEDs 24, 26, 28 and 30 are electrically and physically connected to the substrate 32, which in this embodiment is a printed circuit board (PCB). However, the substrate 32 may be any type of substrate to which the LEDs 24, 26, 28 and 30 can be connected. The PCB 32 has a reflective upper surface 34, which is the surface facing the LEDs 24, 26, 28 and 30.

The color illumination system 22 further includes an optically transparent region 36, a reflective layer 38, a black conformal coating 40, which are positioned over the PCB 32. The optically transparent region 36 is positioned between the LEDs 24, 26, 28 and 30 and the PCB 32. In an embodiment, the optically transparent region 36 is made of optically transparent silicon. However, in other embodiments, the optically transparent region 36 may be made of any suitable optically transparent material, such as clear plastic material. The optically transparent region 32 is a medium in which some of the light emitted from the LEDs 24, 26, 28 and 30 can be transmitted. The reflective layer 38 is positioned on the optically transparent region 36 such that the optically transparent region is sandwiched between the reflective layer and the PCB 32. The reflective layer 38 and the reflective upper surface 34 of the PCB 32 serve to internally reflect light within the optically transparent region 36. The reflective layer 38 may be made of any material that can reflect light. As an example, the reflective layer 38 can be a white reflective film, a mylar film or a reflective mirror film. The black conformal coating 40 is positioned on the reflective layer 38 such that the reflective layer is sandwiched between the black conformal coating and the optically transparent region 36. The black conformal coating 40 serves as a protective layer. As an example, the black conformal coating 40 may be made of silicone rubber, which has good waterproof properties.

The color illumination system 22 further includes an optical sensor 42 and a controller 44. The optical sensor 42 is mounted onto the PCB 32 and positioned within the optically transparent region 36. Thus, the optical sensor 42 is electrically and physically connected to the PCB 32. In this embodiment, the optical sensor 42 is a color sensor. The optical sensor 42 measures the optical properties of incident light, such as intensity and color of the incident light. Since the optical sensor 42 is positioned within the optically transparent region 36, the optical sensor is able to measure the optical properties of the light emitted from the LEDs 24, 26, 28 and 30, some of which is being internally reflected within the optically transparent region by the reflective layer 38 and the reflective upper surface 34 of the PCB 32. The measured optical information may be output from the optical sensor 42 as digital signals. Although the color illumination system 22 is shown and described as having a single optical sensor, the color illumination system in other embodiments may include additional optical sensors, which are mounted onto the PCB 32 and positioned within the optically transparent region 36.

The controller 44 is connected to the optical sensor 42 to receive the measured optical information. The controller 44 is also connected to the LEDs 24, 26, 28 and 30 to provide driving signals to the LEDs, which activates the LEDs to generate light. Similar to the optical sensor 42, the controller 44 may also be mounted onto the PCB 32. Since a particular driving signal applied to one of the LEDs 24, 26, 28 and 30 determines the light output of that LED, the controller 44 is able to control the light output of all the LEDs 24, 26, 28 and 30, and consequently, the brightness and color of the illumination produced from the LED light. The controller 44 is programmed to process the measured optical information from the optical sensor 42 to monitor the light being generated by the LEDs 24, 26, 28 and 30. If the measured intensity or color deviates from a predefined setting, then the controller 44 modifies the driving signals, which are applied to the LEDs 24, 26, 28 and 30, to selectively adjust the light output of the LEDs to control the optical properties of the illumination. As an example, when the light output of a particular LED needs to be increased, the controller 44 increases the frequency of the driving signal applied to that LED. In this manner, the controller 44 is able to control the light output of each of the LEDs 24, 26, 28 and 30, and consequently, control the brightness or the color of the illumination provided by the color illumination system 22. The brightness of the illumination can be controlled by decreasing or increasing the light output of some or all the LEDs 24, 26, 28 and 30. The color of the illumination can be controlled by selectively decreasing or increasing the light output of particular color LEDs. As an example, if the desired color of the illumination is yellow and the measured color of the illumination is reddish yellow, the controller 44 will increase the light output of green LEDs to adjust the illumination to the desired color.

In operation, the controller 44 generates driving signals, which are applied to the LEDs 24, 26, 28 and 30 to activate them. In response to the applied driving signals, each LED generates light. Most of this generated light is emitted in a direction away from the PCB 32, as illustrated in FIG. 2 by arrows 46, where it is combined with the emitted light from other LEDs to provide a color illumination. The color of this illumination depends on the color types of the LEDs 24, 26, 28 and 30, as well as the light output of each LED, which is dependent on the driving signal applied to that LED.

Some of the light emitted from the LEDs 24, 26, 28 and 30 is also transmitted into the optical transparent region 36, as illustrated in FIG. 2 by arrows 48. Within the optically transparent region 36, the light from the LEDs 24, 26, 28 and 30 is internally reflected by the reflective layer 38 and the reflective upper surface 34 of the PCB 32. Some of the light within the optically transparent region 36 is received by the optical sensor 42, which measures the intensity and color of the received light. The measured intensity and color information is then transmitted to the controller 44, e.g., in the form of digital signals.

The controller 44 receives and processes the measured intensity and color information to determine whether the color illumination being provided by the color illumination system 22 has the proper optical properties with respect to brightness and color. If not, the controller 44 selectively modifies the driving signals so that the light output of selected LEDs 24, 26, 28 and 30 is changed to adjust the color illumination provided by the color illumination system 22. Thus, the controller 44 can ensure that the color illumination being provided by the color illumination system 22 meets proper specifications, e.g., NTCIP specifications.

Figure 3:
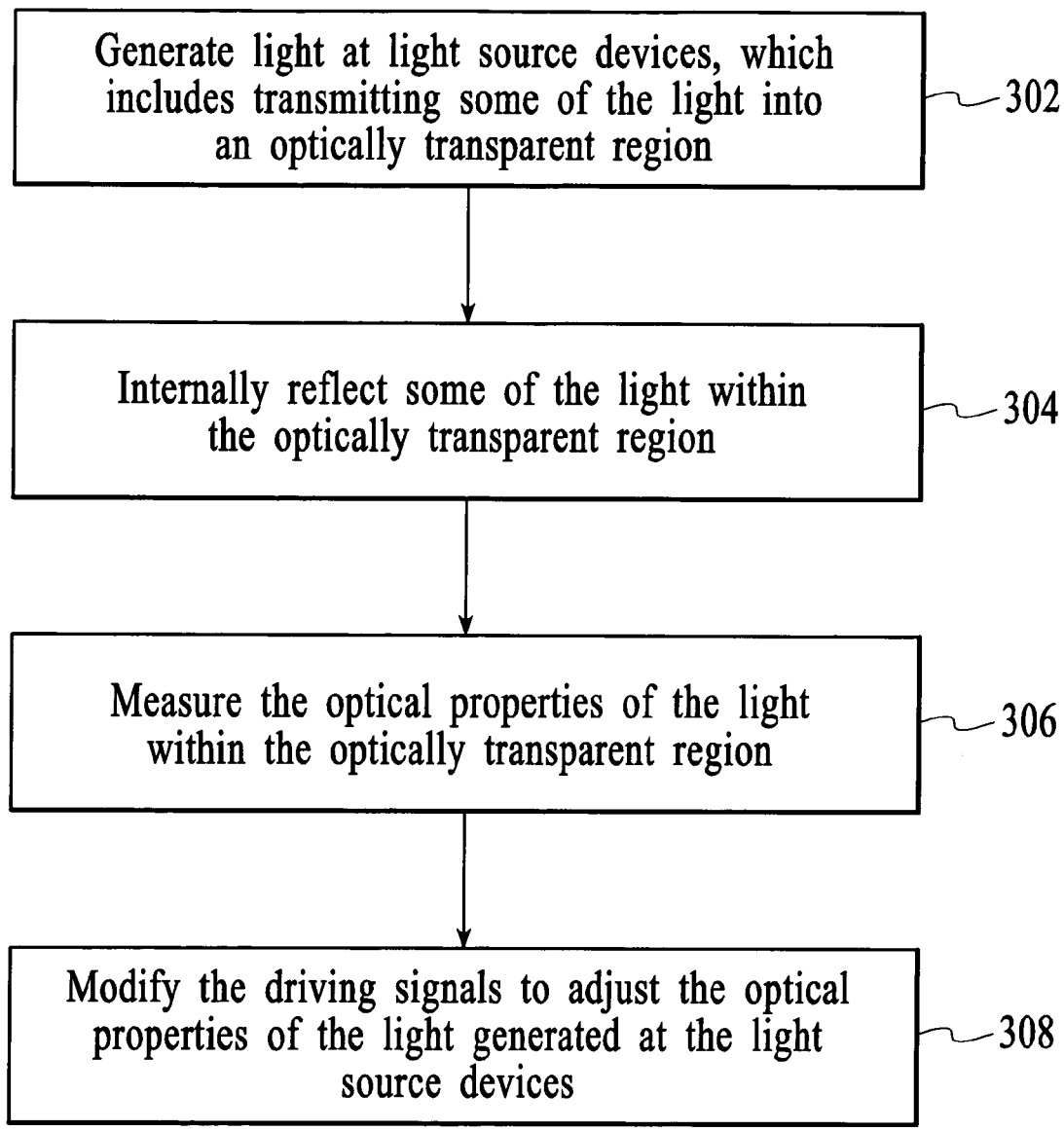
FIG. 3 is a process flow diagram of a method for providing illumination in accordance with an embodiment of the invention.

A method for providing illumination in accordance with an embodiment of the invention is described with reference to a process flow diagram of FIG. 3. At block 302, light is generated at light source devices positioned over a substrate in response to driving signals applied to the light source devices. Furthermore, some of the light is transmitted into an optically transparent region between the light source devices and the substrate. As an example, the light source devices may be semiconductor light emitting devices, such as LEDs. Next, at block 304, some of the light is internally reflected within the optically transparent region. Next, at block 306, optical properties of the light within the optically transparent region are measured. Next, at block 308, the driving signals are modified to adjust the optical properties of the light generated by the light source devices.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An illumination system comprising:
a substrate;
a plurality of light source devices positioned over said substrate, said light source devices being configured to emit light;
an optically transparent region between said light source devices and said substrate;
a reflective layer over said optically transparent region to internally reflect some of said light emitted from said light source devices within said optically transparent region; and
an optical sensor positioned within said optically transparent region to receive some of said light within said optically transparent region to measure optical properties of said light from said light source devices.

2. The system of claim 1 wherein said light source devices include light emitting diodes.

3. The system of claim 1 wherein said optically transparent region is made of optically transparent silicon.

4. The system of claim 1 wherein said optical sensor is a color sensor to measure color of said light from said light source devices.

5. The system of claim 1 wherein said reflective layer is one of a white reflective film, a mylar film and a reflective mirror film.

6. The system of claim 1 further comprising a black conformal coating over said reflective layer.

7. The system of claim 6 wherein said black conformal coating is made of silicone rubber.

8. The system of claim 1 further comprising a controller operatively connected to said optical sensor and said light source devices, said controller being configured to generate driving signals in response to said optical properties measured by said optical sensor, said driving signals being selectively applied to said light source devices to adjust said optical properties of said light from said light source devices.

9. An illuminated display apparatus comprising:
at least one system for providing an illumination, said system comprising:
a substrate;
a plurality of light source devices positioned over said substrate, said light source devices being configured to emit light;
an optically transparent region between said light source devices and said substrate;
a reflective layer over said optically transparent region to internally reflect some of said light emitted from said light source devices within said optically transparent region;
an optical sensor positioned within said optically transparent region to receive some of said light within said optically transparent region to measure optical properties of said light from said light source devices; and a controller operatively connected to said optical sensor and said light source devices, said controller being configured to generate driving signals in response to said optical properties measured by said optical sensor, said driving signals being selectively applied to said light source devices to adjust said optical properties of said light from said light source devices.

10. The apparatus of claim 9 wherein said light source devices include light emitting diodes.

11. The apparatus of claim 9 wherein said optically transparent region is made of optically transparent silicon.

12. The apparatus of claim 9 wherein said optical sensor is a color sensor to measure color of said light from said light source devices.

13. The apparatus of claim 9 wherein said reflective layer is one of a white reflective film, a mylar film and a reflective mirror film.

14. The apparatus of claim 9 wherein said system further comprises a black conformal coating over said reflective layer.

15. The apparatus of claim 14 wherein said black conformal coating is made of silicone rubber.

16. A method for providing illumination; said method comprising:

generating light at light source devices positioned over a substrate in response to driving signals applied to said light source devices, including transmitting some of said light into an optically transparent region between said light source devices and said substrate;

internally reflecting some of said light within said optically transparent region;

measuring optical properties of said light within said optically transparent region; and modifying said driving signals to adjust said optical properties of said light generated at said light source devices.

17. The method of claim 16 wherein said generating includes generating said light at light emitting diodes positioned over said substrate in response to said driving signals applied to said light emitting diodes.

18. The method of claim 16 wherein said generating includes transmitting some of said light into said optically transparent region made of optically transparent silicon between said light source devices and said substrate.

19. The method of claim 16 wherein said measuring includes receiving some of said light within said optically transparent region at an optical sensor positioned within said optical transparent region.

20. The method of claim 16 wherein said internally reflecting includes internally reflecting some of said light within said optically transparent region between a reflective layer over said optically transparent region and an upper surface of said substrate.

* * * * *